United States Patent Office 3,462,599
Patented Aug. 19, 1969

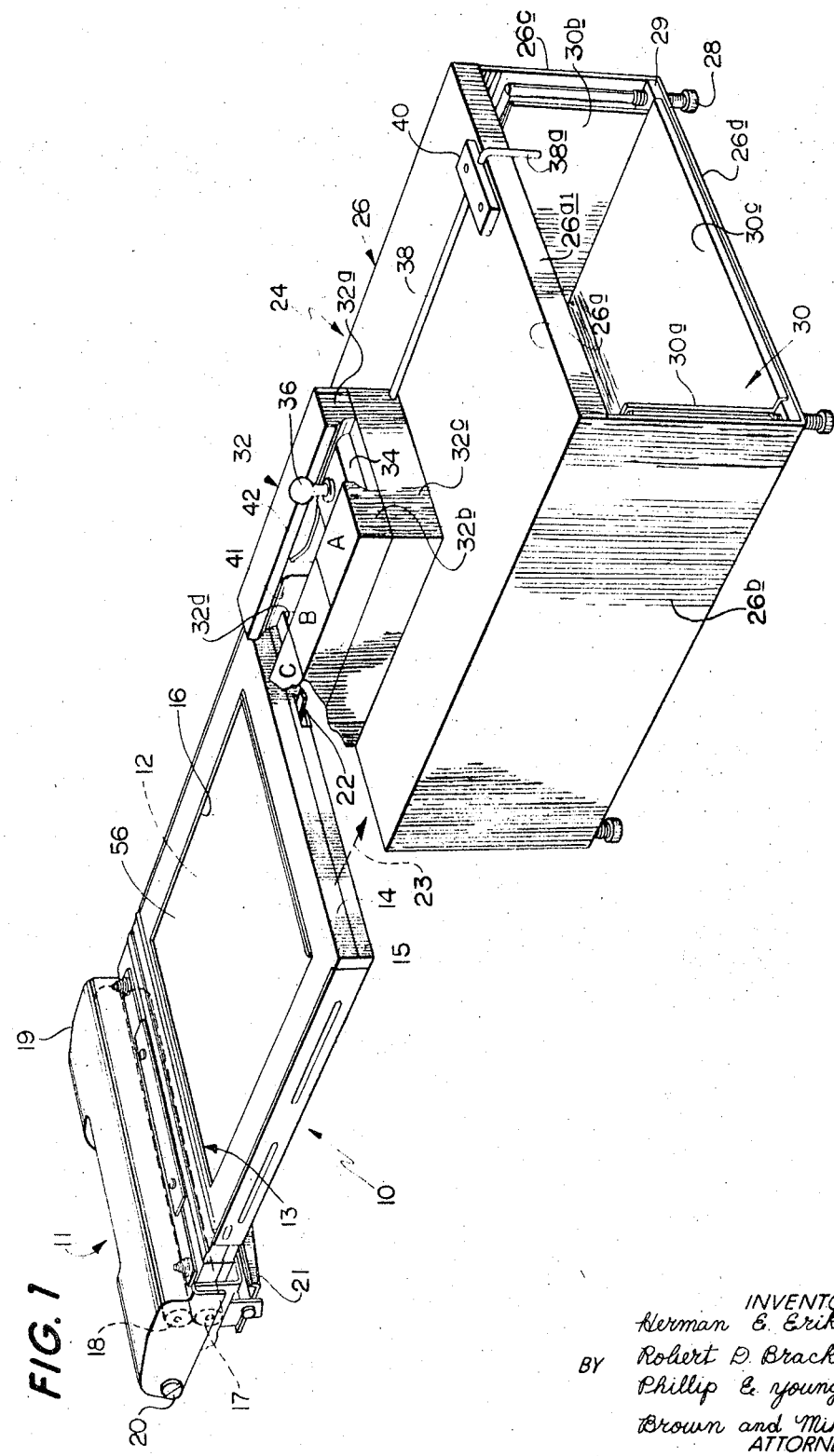

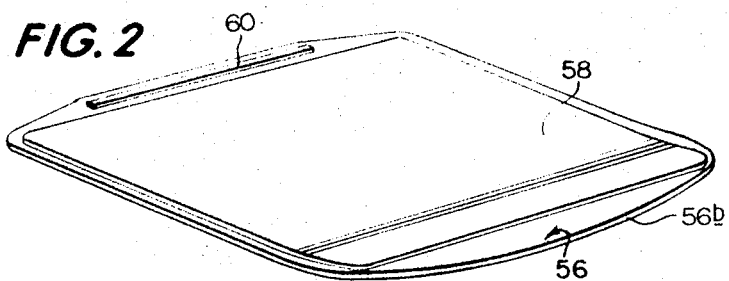
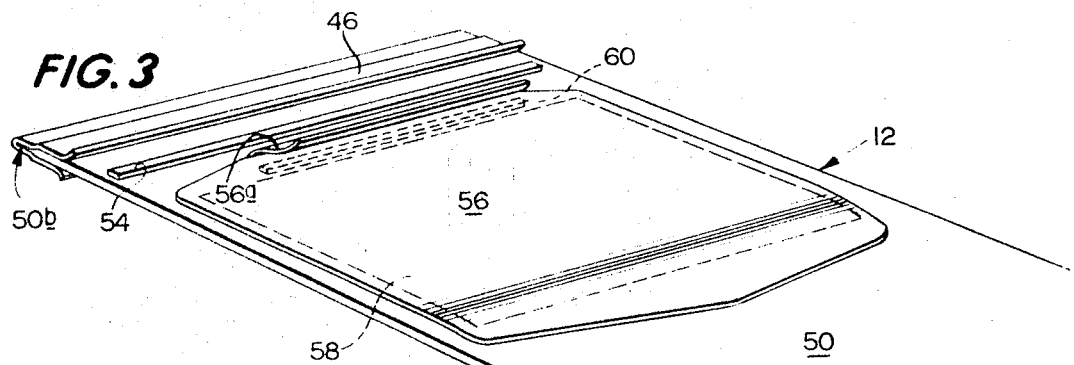
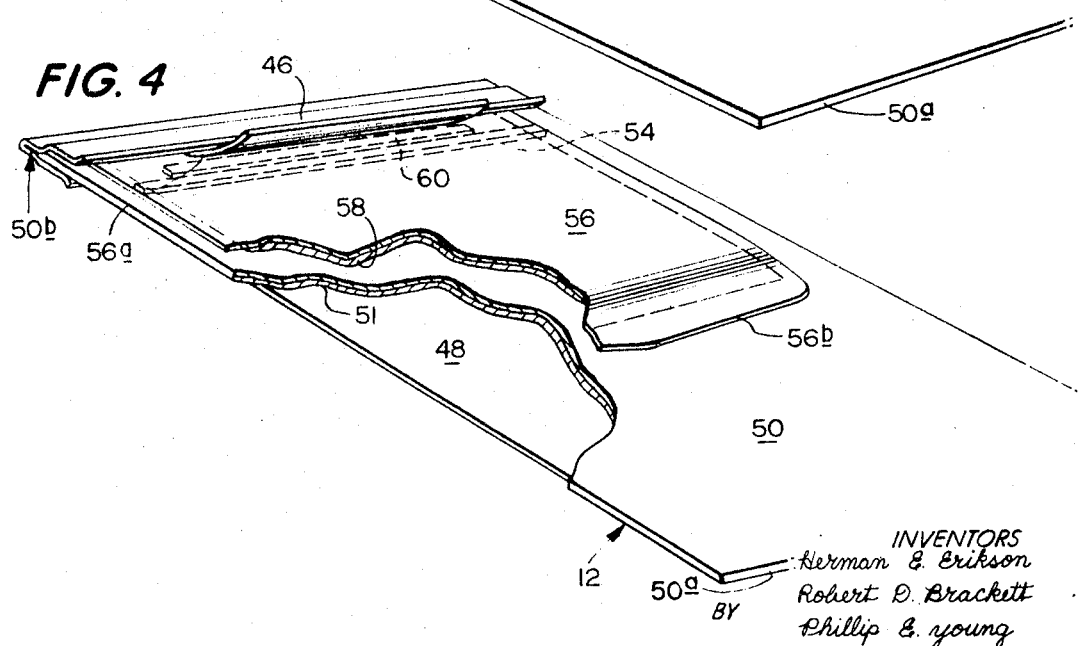

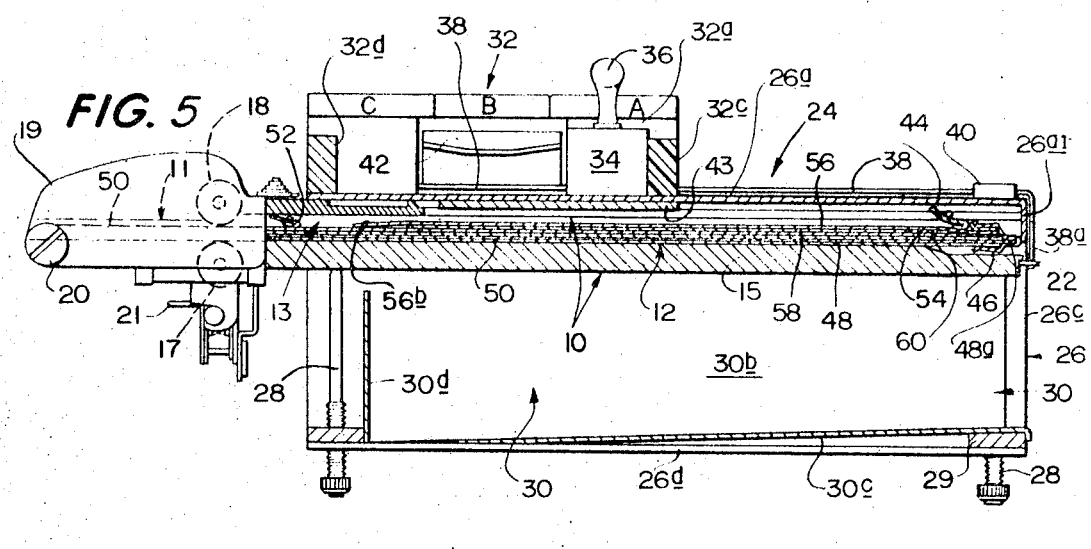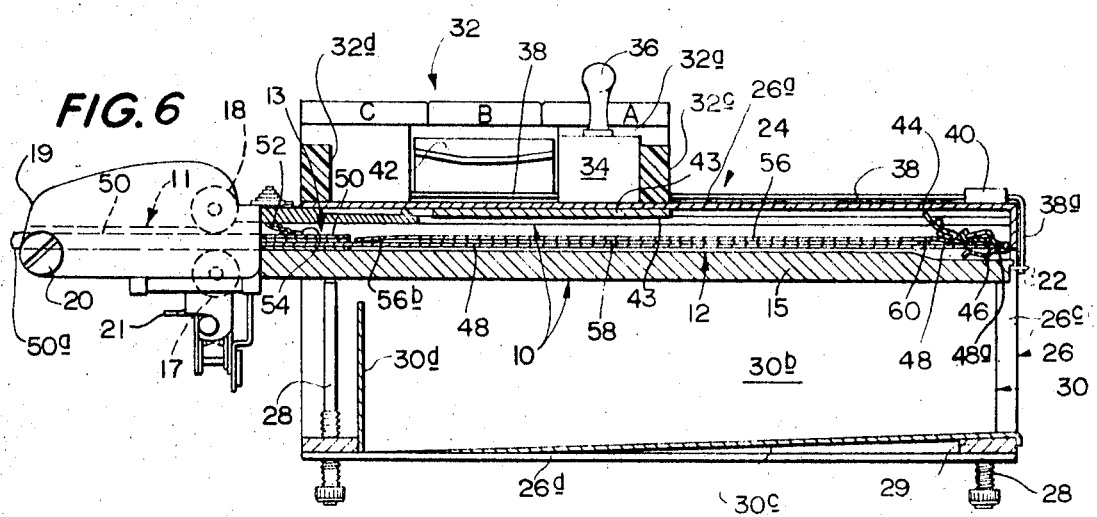

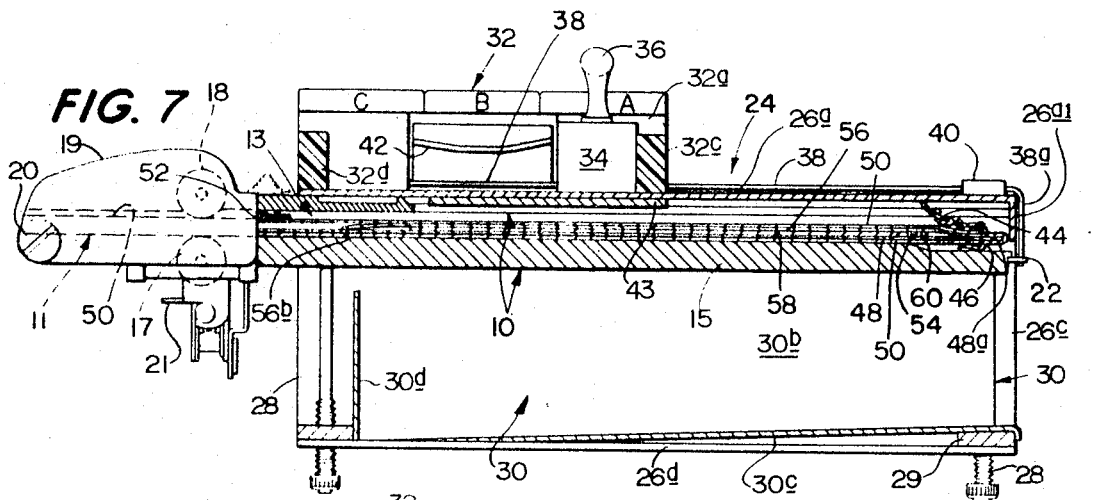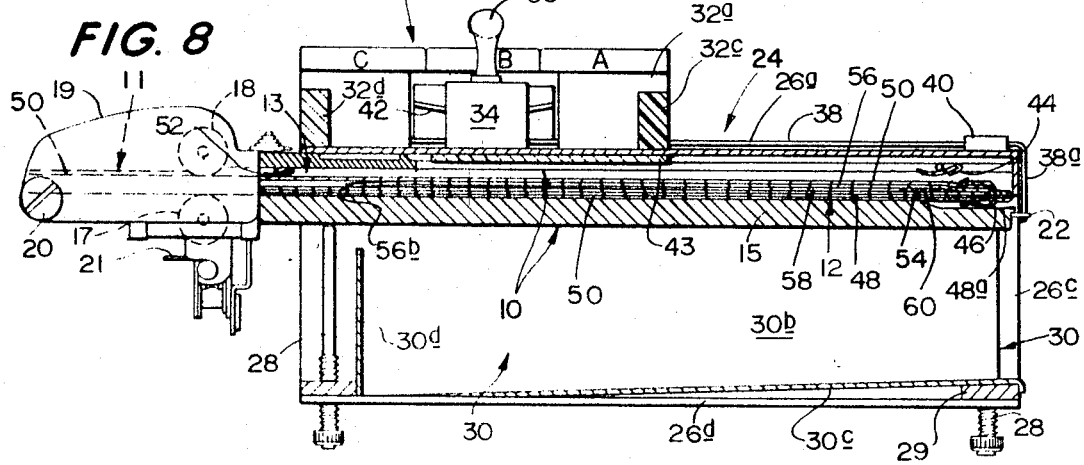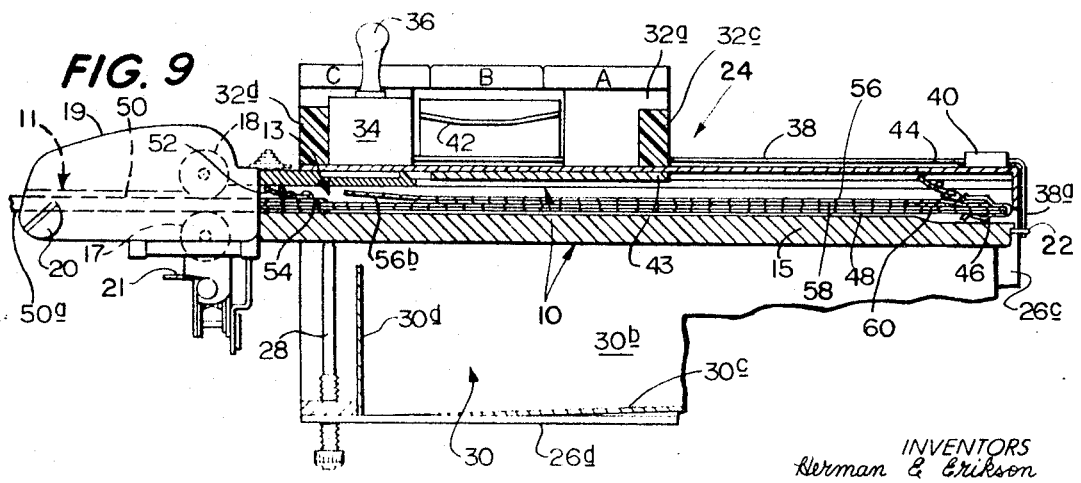

3,462,599
RADIOGRAPHIC APPARATUS FOR INSERTING AN INTENSIFYING SCREEN INTO A SELF-PROCESSING PHOTOGRAPHIC FILM PACK
Herman E. Erikson, Winchester, Robert D. Brackett, Wakefield, and Phillip E. Young, Scituate, Mass., assignors to Polaroid Corporation, Cambridge, Mass., a corporation of Delaware
Filed Aug. 11, 1966, Ser. No. 571,844
Int. Cl. G01n 21/34
U.S. Cl. 250—66        7 Claims This invention relates to radiology and more specifically to apparatus for treating a film unit or assembly of a well-known self-processing type sold by the Polaroid Corporation, Cambridge, Mass., U.S.A. which is intended primarily for conventional photographic use. The subject apparatus serves to adapt the film unit to usage in a novel manner in the field of radiology by incorporating therewith, an intensifying screen, a radioactive sample, or the like.

A conventional film unit of the category above-mentioned is described in detail in U.S. Patent 3,053,160 and is sold by Polaroid Corporation, as a 4" x 5" film packet, "Type 52," "Type 57," or other designation. It comprises two superimposed sheet-like elements enclosed in an envelope, the latter being sealed along three sides or edges, with an unsealed or open end. The sheets are adapted, after processing, to slidable movement out of the envelope through the open end. A first sheet bears a photosensitive emulsion, has a transversely disposed frangible container attached thereto next to the emulsion which contains a processing liquid, and has a transverse clip-like element across one end which holds together the unsealed-end surfaces of the envelope when the sheet is inserted therein to its full depth. This sheet is also adapted to permit the envelope to be slidably removed therefrom for performing photographic exposure of the emulsion and, thereafter, to be returned to its covering position.

The second sheet of the film assembly, termed the "image-receiving sheet" because, during processing, the ultimate image is formed on a surface thereof facing the emulsion by diffusion transfer of an image-forming substance, is releasably attached at one end to an inner surface of the envelope. Accordingly, when the latter is removed for performing the photographic exposure, it too is removed so that the emulsion is completely uncovered. After the exposure, the film unit is processed by passing it between compressive means, thus releasing the processing liquid between the emulsion and image-receiving sheet, a few seconds being required to complete imbibition of the liquid and completion of the image transfer.

When the composite film unit, above described, is employed in a conventional non-radiographic picture-taking and processing capacity, as basically intended, it is mounted in a special film-holder incorporating both exposure and compression-applying processing means. The film-holder, in turn, is adapted to be releasably attached to any camera of suitable size and focal characteristics to render the latter adapted to the self-processing advantages of the subject film unit which make available a finished print within a few seconds following the photographic exposure. The film-holder, of a type generally similar to that which is described in detail in U.S. Patent 2,933,993, and known as the "Polaroid Land Film Holder No. 500," is also sold by the Polaroid Corporation. This film-holder may be employed in conjunction with the apparatus fo the present invention in accomplishing the aforesaid incorporation of an intensifying screen or radioactive sample with the film unit.

In accordance with the foregoing considerations, a principal object of the present invention is to provide, for daylight use in the field, apparatus for inserting and removing an intensifying screen and/or a radioactive sample relative to a film unit of the character described, without danger of fogging a photosensitive component.

Other objects are to provide apparatus for performing the operations of inserting and removing an intensifying screen and/or a radioactive sample relative to a film assembly which is mounted in a film-holder of the type characterized; to provide apparatus as stated which is adapted to convert a film assembly of a type basically intended for photography employing visible light to a film assembly adapted to radiographic use; and to provide apparatus for transforming a film assembly, normally requiring a cassette embodying an intensifying screen for performing a radiographic exposure, to one dispensing entirely with the need for a cassette.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a diagrammatic, partly-exploded, perspective view of the apparatus of the invention;

FIG. 2 is a diagrammatic perspective view of a composite intensifying screen and carrier component therefor of the appartus;

FIGS. 3 and 4 are diagrammatic perspective views of the composite component of FIG. 2 at two positions illustrating its attachment to the film assembly; and FIGS. 5–9 are diagrammatic side elevational views, partly in section, illustrating operation of the apparatus of the invention relative to a given assembly and film holder thereof.

The function of an intensifying screen and the operation of a radioactive sample relative to a photosensitive emulsion are, of course, well known in the radiographic art but will be described briefly herein with respect to a film assembly of the type with which the present invention is concerned, namely, the aforementioned commercially-available composite film packet. When an intensifying screen, positioned in proximity to the emulsion, is subjected to radiant energy of a given imagewise pattern in the form of X-rays, gamma rays, etc., it emits visible light of a similar pattern, producing a differential exposure of the emulsion according thereto.

X-ray cassettes incorporating intensifying screens are conventional and well known in the art. For example, an X-ray cassette for use with the composite film assembly is described in U.S. Patent 3,174,039. It includes an intensifying screen, as a component thereof, which is positionable in superimposed contiguous relation with a photosensitive emulsion of the film assembly. In marked contrast thereto, by permitting the insertion of an intensifying screen into the envelope of the film assembly itself, the apparatus of the present invention serves to expand fields of usage of such a film assembly, namely, it adapts the film assembly to X-ray or autoradiographic use without any need of an accompanying cassette.

Referring now to the drawings, in FIGURE 1 there is shown a film-holder 10 of the type "No. 500," mentioned above. The film-holder 10 includes a light-protected opening or slot at 11 through which the film unit 12, above-described, may be inserted into and withdrawn from a semi-enclosing chamber 13 defined between front portion 14 and rear portion 15 thereof. The film-holder includes an exposure aperture 16 and processing means in the form of a pair of pressure rolls 17 and 18 enclosed by the housing 19 which is pivotally attached to the film-holder frame at 20. In the instance of usual photographic or non-radiographic usage, when the film-holder 10 is mounted on a conventional 4 x 5 press or view camera of suitable size and focal characteristics, the film assembly 12 is to be assumed as aligned with an exposure aperture at the focal plane of the camera and properly positioned for exposure when the enclosing envelope is slidably withdrawn. After photographic exposure of its photosensitive emulsion component, the envelope is returned to its covering position, and the entire film assembly is withdrawn from the film-holder through the slot 11. During this operation the pressure rolls serve to compress the film assembly, to fracture the container component carrying the liquid processing agent and distribute the contents thereof between the first and second sheets of the film assembly. Manually operable means, bearing against a movable mounting support (not shown) for pressure roll 18 and actuated by the lever 21, is adapted, to vary the spacing between the pressure rolls to render them either compressively functional or non-functional. When the rolls are spaced apart by the lever 21, a film unit can be freely inserted in the film-hold 10 without danger of rupturing the container component thereof which holds the processing liquid. An interlocking detent mechanism is also included for selectively engaging and holding certain components of the film assembly within the film-holder while other elements thereof are partially withdrawn and for permitting withdrawal of the entire film assembly. The lever 22 is movable to release the aforementioned detent mechanism, thereby allowing passage of the entire film assembly between the pressure rolls 17 and 18 and its complete withdrawal from the film-holder. When the pressure rolls are spaced apart the lever 22 is automatically spring-biased to the extreme right-hand position shown in FIG. 1. It is capable of being moved against this bias to an extreme left-hand position to release the detent mechanism. The film-holder 10 is moved in the direction of the arrow 23 for slidable insertion into the apparatus element 24 of the present invention.

The apparatus element 24 comprises an assemblage of wall members forming a rectangular, hollow, box-like chamber 26 including an upper wall 26a, side walls 26b and 26c and a lower partial wall 26d. When inserted in the chamber 26, the film-holder is held firmly against the inner surface of upper wall 26a by four retaining screw elements 28 which are inserted in the threaded blocks 29 bonded to the lower wall 26d, adjacent to its four corners. As shown, the retaining elements 28 serve also as feet for supporting the chamber 26, although separate supporting elements may, alternatively, be provided for this purpose. The end of the chamber 26 through which the film-holder 10 is inserted is open. An overturned extremity or flange 26a¹ of the upper wall, at the end of the chamber nearest the viewer in FIG. 1, constitutes a limit stop for determining the maximum insertion of the film-holder 10.

Within the chamber 26 is mounted a four-walled, baffle-like compartment 30 which serves, as required, as a storage area for a reserve supply of the film assemblies 12. It will be noted that the two vertical wall members 30a and 30b thereof terminate short of the upper wall 26a of the chamber to permit the film-holder 10 to be slidably inserted from the end without impediment between their upper extremities and the inner surface of the upper wall 26a.

The bottom wall 30c of the inner compartment is acutely angled to a slight degree in a longitudinal direction to favor retention of the film assemblies in the compartment. The end of the compartment 30 which is adjacent to that end of chamber 26 through which the film-holder is introduced is substantially closed by the transverse wall member 30d which is of a height similar to that of the wall members 30a and 30b. The opposite or near end of compartment 30, as illustrated in FIG. 1, is open. However, it is to be understood that a removable, e.g., a pivotal, closure may be provided at this end, if desired.

A rectangular, operational-control element 32 is mounted on upper wall 26a so as to be located transversely centrally thereof and, longitudinally, at the end adjacent to the entrance opening of chamber 26. The control element 32 includes a pair of transversely-spaced, longitudinally-disposed guide members 32a and 32b providing an open, slot-like central area or channel 33 extending longitudinally therebetween. The ends of the channel are closed by end portions 32c and 32d. A rectangularly-shaped permanent magnet component 34 is slidably mounted for longitudinal movement along the upper surface of wall 26a and between the guides 32a and 32b. The magnet 34 includes a handle 36 for manually moving it back and forth, the end portions 32c and 32d constituting limit stops for determining the extent of such movement. A circular elongated rod 38 is mounted for rotation at one end in bearing means of the end portions 32c and 32d and at the other end in the bearing plate 40. An angled extremity 38a of the rod extends downwardly at a 90° angle, as shown, and constitutes a rotatable lever. A curved vane-like element 42 extends radially from that portion of the rod 38 which is disposed longitudinally between the end members 32c and 32d, to one side of the channel along which the magnet 34 is adapted to slide. The curved tip of the vane 42 protrudes into the channel, that is, into the path of the magnet component 34 and is thus disposed to be contacted by the latter during its movement.

It will be noted that the control element 32 is subdivided into three sections or locations designated A, B, and C. These sections are for the purpose of establishing given slidable positions of the magnet 34. Each of the designations is identified with a given stage in the positioning of the intensifying screen relative to a given component of the film assembly, as provided by the actuating effect of the magnet. A metallic plate 43 is bonded to the under surface of the chamber wall 26a. This plate serves to dissipate magnetic force, that is, to prevent any magnetic force from reaching the interior of the chamber 26 when the magnet is positioned at A.

When the magnet 34 is moved to the longitudinal midpoint of the control element 32 designated B it contacts the projecting vane 42 and causes the rod 38 and its integral lever 38a to rotate, in a clockwise direction as viewed in FIG. 1. Assuming the film-holder to have been inserted in the chamber element 26, the lever 38a has been brought into contact with the lever 22 of the film-holder. The above-described rotation of the lever 38a causes the latter to be moved in a direction to the left, as vieweed in FIG. 1, thus releasing film-restraining detent means of the film-holder to permit removal of the film assembly therefrom. To fully understand the function of the apparatus of the present invention, a somewhat detailed description of operation of the detent mechanism of the film-holder will be given, but only to that extent necessary to an understanding of its coaction with the subject apparatus.

Let it be assumed that the lever 21 of the film-holder has been so actuated as to space the pressure rolls 17 and 18 apart to their maximum extent and that a film assembly is mounted in the film holder. With lever 21 thus actuated, the lever 22 has, automatically, been spring-biased to the extreme right-hand position shown in FIG. 1. The lever 22 is not locked at this location, however, but is capable of being moved to an extreme left-hand position against the bias of its spring (not shown). Coincidentally, within the film-holder, pivotal detent means 44 has been so biased as to engage a resilient metallic end-cap or clip 46 of the film assembly 12 which is fixedly attached to a transverse edge 48a of a sheet 48 coated with a photosensitive emulsion, the sheet being slidably contained in an opaque envelope 50. This structure permits opaque covering envelope 50, the open edges of which at 50b are releasably held together by the clip 46, to be manually withdrawn by a draw-tab portion 50a from the photosensitive layer or sheet 48, the latter being held stationary by reason of continued engagement of the detent 44 with the clip 46. The envelope 50, having an image-receiving sheet 51 attached to an inner surface, may be withdrawn to a distance the limit of which is established by a second pivotal detent means 52 of the film-holder which engages a transverse ridge or flange 54 on an outer surface of the envelope. The envelope may then be manually returned to its covering position, the open end thereof being reintroduced into the flared portions of the clip 46. The foregoing components of the film-holder 10 and the film assembly 12 are those involved in conjunction with the apparatus of the invention. Although a description of additional components of these units is not essential to an understanding of the present invention, it may be found in U.S. Patents 2,933,993 and 3,053,160.

One component of the apparatus of the invention, illustrated in FIG. 2, namely, a thin, flexible plate-like element 56 composed of a metal which is magnetically attractable, is initially positioned, in contiguous relation with a surface of the envelope component 50 of the film assembly 12 before the latter has been loaded in the film-holder 10. The plate 56 has a radiation-emissive substance 58, such as a fluorescent intensifying screen or a radioactive sample, affixed by a suitable adhesive to a surface thereof which, ultimately, is to be brought into direct contact with the photosensitive emulsion of the film assembly, inside of the envelope 50. For purposes of illustration, it will be assumed that the substance 58 is an intensifying screen of a type adapted to convert radiation such as X-rays into visible light for exposing the photosensitive emulsion and it will be so termed hereinafter, for convenience.

One transverse edge portion of the plate 56 is in the form of a wedge-like element 56a. The opposite edge portion 56b is slightly tapered and is also bowed. The wedge-like element 56a is adapted to be manually inserted under the clip 46 of the film assembly and to be releasably held thereby. A transverse flange or bead 60, integral with that surface of the plate 56 which carries the intensifying screen 58, engages the laterally-disposed ridge or raised strip 54 formed on a surface of envelope 50 and contributes to hold the plate 56 in correct position. When thus mounted, the extremity 56b is so bowed as to bear firmly against, but in slidable contact with, the envelope surface as illustrated in FIG. 4. The assembled film unit 12 and plate 56 bearing the intensifying screen 58 is that shown as mounted in the film-holder 10 in FIG. 1, the latter being in readiness for insertion in the chamber 26.

Referring more particularly to FIGS. 5–9, the operation of the apparatus relative to a given film assembly is illustrated in successive stages. In FIG. 5 the magnet 34 is located at the A position which may be considered, in a sense, as a "neutral" location. That is, at this position, the magnet exerts no functional magnetic force on the metalilc plate 56 bearing the intensifying screen 58 by reason of the intervening magnetic-dissipating plate 43. Secondly, the magnet 34 is not in contact with the vane 42. The detent 44 is at holding position, in contact with the clip 46, and the detent 52 is in readiness to contact the raised strip 54 of the envelope 50 when the envelope is manually pulled upon at its draw-tab portion 50a to establish the limit of its withdrawal.

In FIG. 6, withdrawal of the envelope 50 has occurred. The envelope 50, its open end 50b having been released from between the flared ends of the clip 46, has been withdrawn to the limit established by contact of the transverse strip 54 with the detent 52. The photosensitive sheet 48 has remained fixed in position, however, because the clip 46 attached to its end has been held firmly by the detent 44. The bowed extremity 56b of the plate 56 has now slipped off of the trailing end of the envelope and rests on the surface of the photosensitive sheet 48. The photosensitive emulsion is protected from actinic light by the light-tight engagement of the film-holder and chamber unit 26.

The envelope 50 has been manually returned to a position covering the photosensitive sheet 48 in FIG. 7. The open ends 50b of the envelope have been reinserted in the clip 46. The plate 56, bearing the intensifying screen 58, is now within the envelope. The intensifying screen is in direct contact with the photosensitive emulsion.

FIG. 8 illustrates movement of the magnet 34 to the intermediate or B position at which it still exerts no functional magnetic force due to the presence of the dissipating plate 43. However, it has contacted the vane 42, thus rotating the rod 38 and lever 38a in a clockwise direction. Rotation of the latter pushes the lever 22 to the left, as seen in FIG. 1, releasing the detents 44 and 52 from their functional positions. The entire film assembly 12, with the plate 56 and intensifying screen 58 still located within the envelope 50, is withdrawn from the film-holder 10, assuming the lever 21 of the latter to be still at its position for fully spacing the pressure rolls 17 and 18 apart. The assemblage of film assembly, plate and intensifying screen is then employed for performing the X-ray exposure, the intensifying screen, or other radiation emitting substance carried by the plate, serving its function of exposing or facilitating the exposure of the photosensitive emulsion 48.

After performing the exposure, the magnet 34 is returned to the A position, and the film assembly 12, still containing the plate 56 and intensifying screen 58, is once more inserted in the film-holder 10 through the aperture 11. The detents 44 and 52 have again assumed their functional engaging positions. The envelope 50 is then again withdrawn from its covering position to the limit determined by detent 52.

In FIG. 9 the magnet 34 has been moved to position C. The magnetic force exerted thereby has lifted the resilient end-portion 56b of plate 56 from contact with the photosensitive surface 48. The envelope 50 is now returned to its maximum inward position in the film-holder, the plate 56 and integral intensifying screen 58 being held by the magnet 34 away from the envelope surface so that they are once again located outside of the envelope. The magnet 34 is then returned to the B location, thus actuating the vane 42 and releasing the detents 44 and 52 in the manner previously described. The film assembly, with plate 56 and intensifying screen 58 located exteriorly of the envelope is then removed from the film-holder 10. The plate 56 is preferably separated from the film assembly and the latter reintroduced into the film-holder to be processed, the lever 21 being rotated to position the pressure rolls 17 and 18 adjacent to one another for processing purposes. With the pressure rolls thus disposed, processing is achieved in a conventional manner by drawing the film assembly therebetween, thus fracturing the container and spreading the processing liquid between the emulsion 48 and an image-receiving surface 51. The film-holder 10 can, of course, be removed from the apparatus element 24 to perform the processing operation inasmuch as the latter serves no purpose with respect thereto. If desired, the film assembly can be processed with the plate 56 remaining outside of the envelope attached to the clip 46, thus eliminating the last-named steps of separating the plate from the film assembly and reintroducing the latter into the film-holder. It is preferred to remove the plate 56 prior to processing, however.

As previously intimated, the material carried on the surface of the plate 56, although perhaps most usefully a fluorescent intensifying screen and so described, may be any of a choice of radiation-emissive substances. For example it may, alternatively, consist of a substance which spontaneously emits nuclear radiation or include such a substance in conjunction with an intensifying screen. Placement of an intensifying screen within the film assembly itself widens the scope of X-ray photography in that no cassette is necessary because the envelope enclosing the photosensitive component is impervious to visible light while transparent to X rays. Due to the dimensional economy of the film assembly with an intensifying screen positioned therewithin, an especially useful application is that of monitoring X-radiation in various locations. Wherein a radioactive sample is that utilized, its placement within the film assembly permits it to be readily stored in intimate contact with the photosensitive emulsion for an extended period, without the requirement of a separate film-holder for each sample.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Radiographic apparatus for use with a film-holder of a type including exposure and processing means and a film assembly mounted therein including a photosensitive component and a retractable opaque covering envelope, said apparatus, during slidable movement of said envelope, being adapted to selectively insert a radiographic element into said envelope for exposure purposes and remove it after said exposure, and comprising a thin, resilient, magnetically-attractable plate-like element bearing a layer of a radiation-emissive substance, said element being releasably attachable at one end of said film assembly to said photosensitive component thereof and so biased toward said envelope and contained film assembly that, at one position of said envelope, it is adapted to bear against an external surface of said envelope in slidable contact therewith and, at another position of said envelope, it is adapted to bear directly against said photosensitive component, a box-like element forming therewithin a chamber for receiving and firmly mounting said film-holder while shielding said film assembly carried therein from actinic light, guide means so mounted on a wall of said box-like element as to overlie and be contiguous with said magnetically-attractable element when said film assembly is positioned in said chamber, a manually-actuable control element including a permanent magnet mounted in said guide means for slidable movement to a plurality of functional positions, neutralizing means rendering said magnet ineffective at one position whereby said magnetically-attractable element carrying said radiation-emissive substance, by reason of its inherent resilience and bias, is caused to enter said envelope, said magnet at other of said functional positions of said control element providing a magnetic attraction of said magnetically-attractable element in an angular direction away from said film assembly and envelope so as to facilitate its removal from said envelope.

2. Radiographic apparatus, as defined in claim 1, wherein said neutralizing means is a metallic plate of given dimensions attached to the upper wall of said box-like element in substantial alignment with the area of said one position.

3. Radiographic apparatus, as defined in claim 2, wherein said guide means is mounted on an external surface of said wall overlying a transverse mid-portion of said plate-like element and wherein said metallic plate is affixed to the inner surface of said upper wall, underlying a given portion of said guide means.

4. Radiographic apparatus as defined in claim 1, wherein one end of said reslient plate-like element bears against said envelope, said end being curved in a direction toward said enevlope.

5. Radiographic apparatus for use with a film-holder of a type including detent, exposure, and processing means and a film assembly mounted therein including a releasably-contained processing liquid, a photosensitive element, an image-receiving element, means cooperating with said detent means, and a retractable covering envelope, said film assembly being adapted to be exposed and processed in said film-holder, said apparatus when actuated being capable of inserting and removing a radiation-emissive substance relative to said envelope for contributing to the exposure of said photosensitive element without requiring a cassette for the purpose, and comprising a thin, metallic magnetically-attractable sheet-like element of a given contour bearing said radiation-emissive substance, said sheet-like element element being releasably-attachable to an engaging component fixed to a transverse edge of said photosensitive element and in slidable contact with an external surface of said covering envelope, a box-like element forming a generally rectangular chamber for receiving and holding firmly mounted therein said film-holder and contained film assembly with attached metallic sheet-like element, said photosensitive element being thus shielded against the entrance thereto of actinic light, guide means mounted on a given wall of said box-like element, a rod having integral vane and lever portions pivotally mounted on said given wall adjacent to said guide means, a permanent magnet including an actuating knob slidably-mounted in said guide means for assuming, when manually actuated, any of a plurality of functional positions and adapted, at certain of said positions, to selectively bear against said vane so as to rotate said rod and lever portion thereof thereby to actuate said detent means of said film-holder and to magnetically raise and lower said sheet-like element relative to said film assembly, thus permitting the selective introduction of said sheet-like element into, and its removal from, said envelope during slidable movement of the latter.

6. Radiographic apparatus for use with a film-holder of a type including exposure and processing means and a film assembly mounted therein including a photosensitive component and a retractable opaque covering envelope, said apparatus, during slidable movement of said envelope, being adapted to selectively insert a radiographic element into said enevlope for exposure purposes and remove it after said exposure, and comprising a magnetically-attractable plate-like element adapted to carry a layer of a radiation-emissive substance, said plate-like element being releasably attachable by means, located at one end thereof, to engaging means, located at one end of said photosensitive component, and so biased toward said envelope and contained film assembly that, at one position of said enevlope, it is adapted to bear against an external surface of said enevlope in slidable contact therewith and, at another position of said envelope, it is adapted to bear directly against said photosensitive component, a box-like element forming a chamber for receiving and firmly mounting said film-holder while shielding said film assembly carried therein from actinic light, guide means so mounted on a wall of said box-like element as to be aligned with an adjacent to said magnetically-attractable element when said film assembly is positioned in said film-holder and the latter is mounted in said chamber, a manually-actuable control element including a permanent magnet mounted in said guide means for slidable longitudinal movement to a plurality of functional positions, neutralizing means rendering said magnet ineffective at a given position thereof whereby at said position said magnetically-attractable plate-like element, by reason of its bias toward said envelope and photosensitive component is caused to contact said photosensitive component and to lie within said envelope while the latter is returned to its covering location, said magnet at another of said functional positions thereof providing a magnetic attraction of said magnetically-attractable plate-like element in an angular direction away from said photosensitive component whereby, when said envelope is withdrawn from its covering location, said plate-like element is lifted from contact with said photosensitive component and, thereafter, with said magnet again at said given position, is permitted to bear against an external surface of said envelope while said envelope is returned to its location covering said photosensitive component.

7. Radiographic apparatus, as defined in claim 6, wherein said means located at one end of said plate-like element is a wedge portion thereof, and wherein said engaging means located at one end of said photosensitive component is a metallic clip, said wedge portion being adapted to be inserted between said clip and a surface of said photosensitive component and releasably held therebetween.

References Cited
UNITED STATES PATENTS 2,689,306 9/1954 Land _____ 250—68
3,371,208 2/1968 Brakcett _____ 250—68

RALPH G. NILSON, Primary Examiner

C. E. CHURCH, Assistant Examiner

U.S. Cl. X.R.

250—68